United States Patent
Ibrahim et al.

(10) Patent No.: US 10,965,435 B2
(45) Date of Patent: Mar. 30, 2021

(54) TECHNIQUES FOR PRE- AND DECODING A MULTICARRIER SIGNAL BASED ON A MAPPING FUNCTION WITH RESPECT TO INBAND AND OUT-OF-BAND SUBCARRIERS

(71) Applicant: HUAWEI TECHNOLOGIES DUESSELDORF GMBH, Munich (DE)

(72) Inventors: Mohamed Ibrahim, Munich (DE); Wen Xu, Munich (DE)

(73) Assignee: Huawei Technologies Duesseldorf GmbH, Duesseldorf (DE)

(*) Notice: Subject to any disclaimer, the term of this patent is extended or adjusted under 35 U.S.C. 154(b) by 0 days.

(21) Appl. No.: 16/414,382

(22) Filed: May 16, 2019

(65) Prior Publication Data
US 2019/0273598 A1  Sep. 5, 2019

Related U.S. Application Data

(63) Continuation of application No. PCT/EP2016/077887, filed on Nov. 16, 2016.

(51) Int. Cl.
*H04L 27/26* (2006.01)
*H04L 5/02* (2006.01)
(Continued)

(52) U.S. Cl.
CPC .............. *H04L 5/026* (2013.01); *H04L 5/001* (2013.01); *H04L 5/0098* (2013.01); *H04L 25/08* (2013.01);
(Continued)

(58) Field of Classification Search
CPC .. H04B 1/04; H04B 7/06; H04B 15/00; H04L 5/00; H04L 5/02; H04L 5/001;
(Continued)

(56) References Cited

U.S. PATENT DOCUMENTS

2001/0044719 A1* 11/2001 Casey ................... G06F 16/683
704/245
2008/0108310 A1* 5/2008 Tong .................... H04B 7/0673
455/69
(Continued)

FOREIGN PATENT DOCUMENTS

WO     2011009239 A1    1/2011
WO     2012100279 A1    8/2012
(Continued)

OTHER PUBLICATIONS

Cosovic et al.,"Subcarrier Weighting: a Method for Sidelobe Suppression in OFDM Systems," IEEE Communication Letters, vol. 10, No. 6, pp. 444-446, Institute of Electrical and Electronics Engineers, New York, New York (Jun. 2006).

*Primary Examiner* — Shawkat M Ali
(74) *Attorney, Agent, or Firm* — Leydig, Voit & Mayer, Ltd.

(57) ABSTRACT

The disclosure relates to a transmission device, comprising: a processor configured: to generate a multicarrier signal based on a combination of data symbols and reference symbols, wherein the multicarrier signal comprises a first plurality of inband subcarriers and a second plurality of out-of band (OOB) subcarriers, and to precode the multicarrier signal based on a mapping function with respect to the first plurality of inband subcarriers and the second plurality of out-of band subcarriers, wherein the mapping function is configured to mitigate the OOB subcarriers.

20 Claims, 9 Drawing Sheets

(51) Int. Cl.
    *H04L 5/00*           (2006.01)
    *H04L 25/08*         (2006.01)
    *H04L 27/00*         (2006.01)

(52) U.S. Cl.
    CPC ........ *H04L 27/264* (2013.01); *H04L 27/2621* (2013.01); *H04L 27/2626* (2013.01); *H04L 2027/0087* (2013.01); *H04L 2027/0089* (2013.01)

(58) Field of Classification Search
    CPC ....... H04L 5/026; H04L 5/0098; H04L 25/03; H04L 25/08; H04L 27/2621; H04L 27/2626; H04L 27/2627; H04L 27/2649; H04W 24/00; H04W 24/02; H04W 72/04; H04W 72/08; H04W 88/02
    USPC ........ 370/208, 210, 252; 375/219, 229, 260, 375/267, 295, 316
    See application file for complete search history.

(56) References Cited

U.S. PATENT DOCUMENTS

2012/0036614 A1*   2/2012   Meschter ................. A41D 1/08
                                                                               2/228
2016/0036614 A1*   2/2016   Van De Beek ... H04L 25/03834
                                                                              375/295

FOREIGN PATENT DOCUMENTS

WO         2014113754 A1    7/2014
WO         2014169947 A1   10/2014

\* cited by examiner

TECHNIQUES FOR PRE- AND DECODING A MULTICARRIER SIGNAL BASED ON A MAPPING FUNCTION WITH RESPECT TO INBAND AND OUT-OF-BAND SUBCARRIERS

CROSS-REFERENCE TO RELATED APPLICATIONS

This application is a continuation of International Application No. PCT/EP2016/077887, filed on Nov. 16, 2016. the disclosure of which is hereby incorporated by reference in its entirety.

TECHNICAL FIELD

Embodiments of the present disclosure relate to techniques for precoding and decoding a multicarrier signal based on a mapping function with respect to inband subcarriers and out-of-band (OOB) subcarriers. In particular, embodiments of the present disclosure relate to a precoder for OOB emission suppression for hybrid FDD/TDD (Frequency Division Duplex/Time Division Duplex) frame structures.

BACKGROUND

In an FDD system, the transmitter receives its data stream at a neighboring carrier frequency. When the receiving carrier frequency is placed close to the transmit carrier frequency, the received signal which is already distorted from path loss and channel fading will suffer further distortions from the transmit signal's sidelobes, a phenomena known as self-interference. By packing the transmit and receive signals closer to each other in the frequency domain, we yield a higher spectral efficiency since there is no longer need to insert a guard band between the transmit and receive frequency bands.

To solve this problem various approaches exist. Sometimes RF analog filters are used to filter out the transmit signal using bandpass filters. Analog filters occupy large area and consume a lot of energy deeming it not practical for future transceivers. Alternatively, the receiving frequency can be placed as far as possible from the transmit signal frequency.

In the time correlation approach that is based on time domain processing, a controlled correlation between the time samples of the signal is introduced so that high frequencies are suppressed. In the Active Interference Cancellation approach a set of subcarriers (usually at the edge of the spectrum) is tuned to cancel the OOB emissions according to the data symbols which are not modified. In the Data Precoding approach information symbols are modified in order to suppress OOB emissions. In this approach some error is introduced at the transmitter side which introduces Error Vector Magnitude (EVM) leading to a reduction of SNR. In ultra-reliable communications, however, SNR reduction is not acceptable.

Generally speaking, most of the known solutions are based on distorting the transmit signal or consuming higher energy to reduce the out-of-band emission.

SUMMARY

It is an object of the disclosure to improve transmission of a signal, in particular to provide a concept for mitigating the above described self-interference phenomena without distorting the signal or increasing energy consumption.

This object is achieved by the features of the independent claims. Further implementation forms are apparent from the dependent claims, the description and the figures.

A aspect of the disclosure is to precode the transmit signal using a near-orthogonal space depending on the range of out-of-band subcarriers that need to be suppressed. The signal is totally distorted through precoding and is then reconstructed at the receiver. A channel estimation mechanism is presented to facilitate the receiver's equalization procedure by using the redundant subcarriers for channel estimation.

The transmission and reception devices described herein may be implemented in wireless communication networks, in particular communication networks based on mobile communication standards such as LTE, in particular LTE-A and/or OFDM. The transmission and reception devices described herein may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The transmission and reception devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The transmission and reception devices described herein may be designed in accordance to mobile communication standards such as e.g. the Long Term Evolution (LTE) standard or the advanced version LTE-A thereof. LTE (Long Term Evolution), marketed as 4G and 5G LTE and beyond, is a standard for wireless communication of high-speed data for mobile phones and data terminals.

The transmission and reception devices described herein may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

In order to describe the disclosure in detail, the following terms, abbreviations and notations will be used:
OOB: Out-Of-Band
FDD: Frequency Division Duplex
TDD: Time Division Duplex
EVM: Error Vector Magnitude
D2D: Device-to-device
FO: Frequency Offset
OFDM: Orthogonal Frequency Division Multiplex
W: Transfer Matrix
DL: Downlink
UL: Uplink
BS: Base Station, eNodeB, eNB
UE: User Equipment, e.g. a mobile device or a machine type communication device
4G: $4^{th}$ generation according to 3GPP standardization
5G: $5^{th}$ generation according to 3GPP standardization
LTE: Long Term Evolution
RF: Radio Frequency
SNR: Signal to Noise Ratio According to a first aspect, the disclosure relates to a transmission device, comprising: a processor configured: to generate a multicarrier signal based on a combination of data symbols and reference symbols, wherein the multicarrier signal comprises a first plurality of inband subcarriers and a second plurality of out-of band (OOB) subcarriers, and to precode the multicarrier signal based on a mapping function with respect to the first plurality of inband subcarriers and the second plurality of out-of-band subcarriers, wherein the mapping function is configured to mitigate the OOB subcarriers.

By using such a mapping function for precoding the multicarrier signal the above described self-interference phenomena can be efficiently mitigated without distorting the signal or increasing energy consumption.

Note that the multicarrier signal includes both, the inband subcarriers and the out-of-band subcarriers. However, the OOB subcarriers are not generated by the processor. The processor only generates the inband subcarriers and just takes the OOB subcarriers into account. These OOB subcarriers are designed to be always zero but can take on values different from zero due to a slight asynchronism between transmitter and receiver oscillators.

In a first possible implementation form of the transmission device according to the first aspect, the mapping function is based on a frequency offset (FO) between a oscillator of a transmitter transmitting the precoded multicarrier signal and an oscillator of a receiver receiving the precoded multicarrier signal, in particular a frequency offset (α) normalized to the subcarrier spacing.

This provides the advantage that the mapping function can consider the asynchronism between transmitter and receiver oscillators and hence control the suppression of OOB distortion with high precision.

In a second possible implementation form of the transmission device according to the first aspect as such or according to the first implementation form of the first aspect, the mapping function is based on a distance (β) between the out-of-band subcarriers.

This provides the advantage that the mapping function can better reflect the influence of the non-orthogonal vectors selected from the non-orthogonal space to generate a flatter OOB noise compared to existing solutions, e.g. as shown below with respect to FIG. 4.

In a third possible implementation form of the transmission device according to the first aspect as such or according to any one of the preceding implementation forms of the first aspect, the mapping function is based on a transfer matrix W transferring the first plurality of inband subcarriers to the second plurality of out-of band subcarriers.

This provides the advantage that by using the transfer matrix in the mapping function, an analytical formulation of the mapping of the inband carriers to the OOB carriers can be applied resulting in improved accuracy.

In a fourth possible implementation form of the transmission device according to the third implementation form of the first aspect, the transfer matrix W is based on one of an orthogonal frequency division multiplexing (OFDM) waveform, a polar-OFDM (p-OFDM) waveform or a filter bank based multicarrier (FBMC) waveform.

This provides the advantage that the transmission device can be flexibly applied to a multiplicity of different multicarrier technologies.

In a fifth possible implementation form of the transmission device according to any of the third or fourth implementation forms of the first aspect, elements of the transfer matrix W in the i-th row and the j-th column are represented by the following OFDM waveform equation:

$$W^{i,j} = \frac{\sin(\alpha\pi)\cdot(-1)^{\beta i+j}}{\pi\cdot(\beta i+j)},$$

where α is the frequency offset normalized to the subcarrier spacing and β is the distance between the out-of-band subcarriers.

This provides the advantage that precoding can be easily and efficiently applied by using such formula.

In a sixth possible implementation form of the transmission device according to any of the third to the fifth implementation forms of the first aspect, the mapping function is configured to project the first plurality of inband subcarriers at least partially to the null space of the transfer matrix W.

This provides the advantage that the precoder condition of lying totally in the null space is relaxed. Hence, design of the precoding is simplified and computational complexity of such a precoder implemented by the processor is reduced.

In a seventh possible implementation form of the transmission device according to the sixth implementation form of the first aspect, the mapping function is configured to project at least one component on an OOB space of the transfer matrix W.

This provides the advantage that at least one component, preferably the strongest contribution to out-of-band emission can be mitigated resulting in a significant mitigation of self-interference.

In an eighth possible implementation form of the transmission device according to any of the third to the seventh implementation forms of the first aspect, the processor is configured to determine the mapping function based on a singular value decomposition (SVD) of the transfer matrix W.

This provides the advantage that such a singular value decomposition can be efficiently computed by using available standard algorithms.

In a ninth possible implementation form of the transmission device according to the eighth implementation form of the first aspect, the mapping function is based on a number κ of vectors selected from a non-orthogonal space of the SVD.

This provides the advantage that by selecting the number κ of vectors from the non-orthogonal space of the SVD, the number of redundant subcarriers can be controlled. By including more independent vectors to the precoder, the number of redundant subcarriers can be reduced and used for data transmission which boosts the spectral efficiency of the transmission.

In a tenth possible implementation form of the transmission device according to the ninth implementation form of the first aspect, the processor is configured to sort the singular values ($\lambda_i$) according to their amplitudes and to select the number (κ) of vectors from vectors corresponding to the smallest number (κ) of eigenvalues ($\lambda_i$) from right matrix of the SVD. This means that the processor selects from the V matrix of the SVD decompositions which is also referred to as the right hand side matrix of the SVD decomposition.

This provides the advantage that the singular vectors having the strongest contribution to the OOB emission can be selected and preferably cancelled.

In an eleventh possible implementation form of the transmission device according to any of the third to the tenth implementation forms of the first aspect, the processor is configured to increase the number of OOB subcarriers to cover a wider range of suppression in an OOB space of the transfer matrix W.

By covering a wider range of suppression in an OOB space of the transfer matrix W, suppression of self-interference can be performed more efficiently.

In a twelfth possible implementation form of the transmission device according to any of the third to the eleventh implementation forms of the first aspect, the processor is configured to tune a distance ($\beta$) between the out-of-band subcarriers in order to equally distribute notches in the OOB space of the transfer matrix W across the range of subcarriers.

This provides the advantage that a less and flatter range of OOB distortion can be achieved providing high efficient self-interference suppression.

In a thirteenth possible implementation form of the transmission device according to the first aspect as such or according to any of the preceding implementation forms of the first aspect, the processor is configured to provide parameters indicating properties of the mapping function for signaling over a control channel.

This provides the advantage that the transmission device can flexibly apply the optimum precoding parameters and does not have to use predetermined precoding parameters. The applied precoding parameters can be transferred via the control channel to the receiving device that can decode data based on these received precoding parameters.

In a fourteenth possible implementation form of the transmission device according to the thirteenth implementation form of the first aspect, the parameters indicating properties of the mapping function comprise at least one of the following: the frequency offset ($\alpha$) normalized to the subcarrier spacing, a number of OOB notch subcarriers $N_b$, a number of data subcarriers $N_r$, a number ($\kappa$) of non-orthogonal vectors, a plurality of reference signals subcarriers L.

By transferring these parameters to the reception device, the receiver can efficiently decode the precoded data and reconstruct the original data with high precision.

According to a second aspect, the disclosure relates to a reception device, comprising: a receiver configured to receive a multicarrier signal that is based on a combination of data symbols and reference symbols, wherein the multicarrier signal comprises a first plurality of inband subcarriers and a second plurality of out-of band (OOB) subcarriers; and a processor configured to decode the multicarrier signal based on a mapping function with respect to a first plurality of inband subcarriers and a second plurality of out-of band subcarriers, wherein the mapping function is configured to mitigate the OOB subcarriers.

By using such a mapping function for decoding the multicarrier signal the above described self-interference phenomena can be efficiently mitigated without distorting the signal or increasing energy consumption.

In a first possible implementation form of the reception device according to the second aspect, the receiver is configured to receive parameters indicating properties of the mapping function signaled over a control channel.

This provides the advantage that optimum precoding parameters can be applied for the precoding/decoding, i.e. no predetermined precoding parameters have to be used. The applied precoding parameters can be transferred via the control channel to the reception device that can decode data based on these received precoding parameters.

In a second possible implementation form of the reception device according to the first implementation form of the second aspect, the parameters indicating properties of the mapping function comprise at least one of the following: the frequency offset ($\alpha$) normalized to the subcarrier spacing, a number of OOB notch subcarriers $N_b$, a number of data subcarriers $N_r$, a number ($\kappa$) of non-orthogonal vectors, a plurality of channel estimation subcarriers L.

By using these parameters the reception device can efficiently decode the precoded data and reconstruct the original data with high precision.

According to a third aspect, the disclosure relates to a transmission method, comprising: generating a multicarrier signal based on a combination of data symbols and reference symbols, wherein the multicarrier signal comprises a first plurality of inband subcarriers and a second plurality of out-of band (OOB) subcarriers, and precoding the multicarrier signal based on a mapping function with respect to the first plurality of inband subcarriers and the second plurality of out-of band subcarriers, wherein the mapping function is configured to mitigate the OOB subcarriers.

By using such a mapping function for precoding the multicarrier signal the above described self-interference phenomena can be efficiently mitigated without distorting the signal or increasing energy consumption.

Note that the multicarrier signal includes both, the inband subcarriers and the out-of-band subcarriers. However, the OOB subcarriers are not generated by the transmission method. The transmission method only generates the inband subcarriers and just takes the OOB subcarriers into account. These OOB subcarriers are designed to be always zero but can take on values different from zero due to a slight loss of synchronization between transmitter and receiver oscillators.

According to a fourth aspect, the disclosure relates to a reception method, comprising: receiving a multicarrier signal that is based on a combination of data symbols and reference symbols, wherein the multicarrier signal comprises a first plurality of inband subcarriers and a second plurality of out-of band (OOB) subcarriers; and decoding the multicarrier signal based on a mapping function with respect to the first plurality of inband subcarriers and the second plurality of out-of band subcarriers, wherein the mapping function is configured to mitigate the OOB subcarriers.

By using such a mapping function for decoding the multicarrier signal the above described self-interference phenomena can be efficiently mitigated without distorting the signal or increasing energy consumption.

According to a fifth aspect, the disclosure relates to a communication system between two entities each comprises a precoder and decoder, where each transmit entity comprises a means for generating a multicarrier signal, where said multicarrier signal is a combination of data subcarriers and reference signal known to the receiver, where the combination is based on a map matrix which maps the inband transmission to the out-of-band frequency emission.

In a first possible implementation form of the communication system according to the fifth aspect, the out-of-band frequency range belongs to the reception frequency of the transmitting entity, which is placed close or adjacent to the transmission frequency, in particular which is continuously changing.

In a second possible implementation form of the communication system according to the fifth aspect, the said map matrix is constructed according to the actual frequency offset between the clocks of the communicating entities.

In a third possible implementation form of the communication system according to the fifth aspect as such or according to the second implementation form of the fifth aspect, the frequency offset is continually monitored by both communicating entities and is signaled to the receiver.

In a fourth possible implementation form of the communication system according to the fifth aspect, the transmitter extracts its precoding matrix from the map matrix to obtain an orthogonal or quasi-orthogonal space using the SVD decomposition.

In a fifth possible implementation form of the communication system according to the fifth aspect as such or according to the fourth implementation form of the fifth aspect, the number of non-orthogonal vectors, κ, used in the precoding matrix is selected according to their corresponding minimum singular values of the SVD decomposition.

In a sixth possible implementation form of the communication system according to the fifth implementation form of the fifth aspect, the parameter κ is signaled to the receiver.

In a seventh possible implementation form of the communication system according to the fifth aspect as such or according to any of the fourth or fifth implementation forms of the fifth aspect, the transmit signal is a linear combination of the precoder matrix, with the weights of the combination being the data, reference, and redundant subcarriers.

In an eighth possible implementation form of the communication system according to the fifth aspect, the reference signals are precoded by the precoder to yield a constant transmit value over a range of subcarriers.

In a ninth possible implementation form of the communication system according to the fifth aspect as such or according to the eighth implementation form of the fifth aspect, the constant value is obtained using a LS projection of the precoder space onto the desired null subcarriers.

In a tenth possible implementation form of the communication system according to the fifth aspect as such or according to any of the eighth or ninth implementation forms of the fifth aspect, the number of subcarriers having a constant value L is signaled to the receiver.

In an eleventh possible implementation form of the communication system according to the fifth aspect, the receiver uses the information about the frequency offset, number of non-orthogonal vectors kappa to reconstruct the precoder matrix and obtain an inverse of the matrix for reconstruction of the precoded signal.

In a twelfth possible implementation form of the communication system according to the fifth aspect, the receiver averages the received signal over L subcarriers to obtain an estimate of the channel over the L subcarriers.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
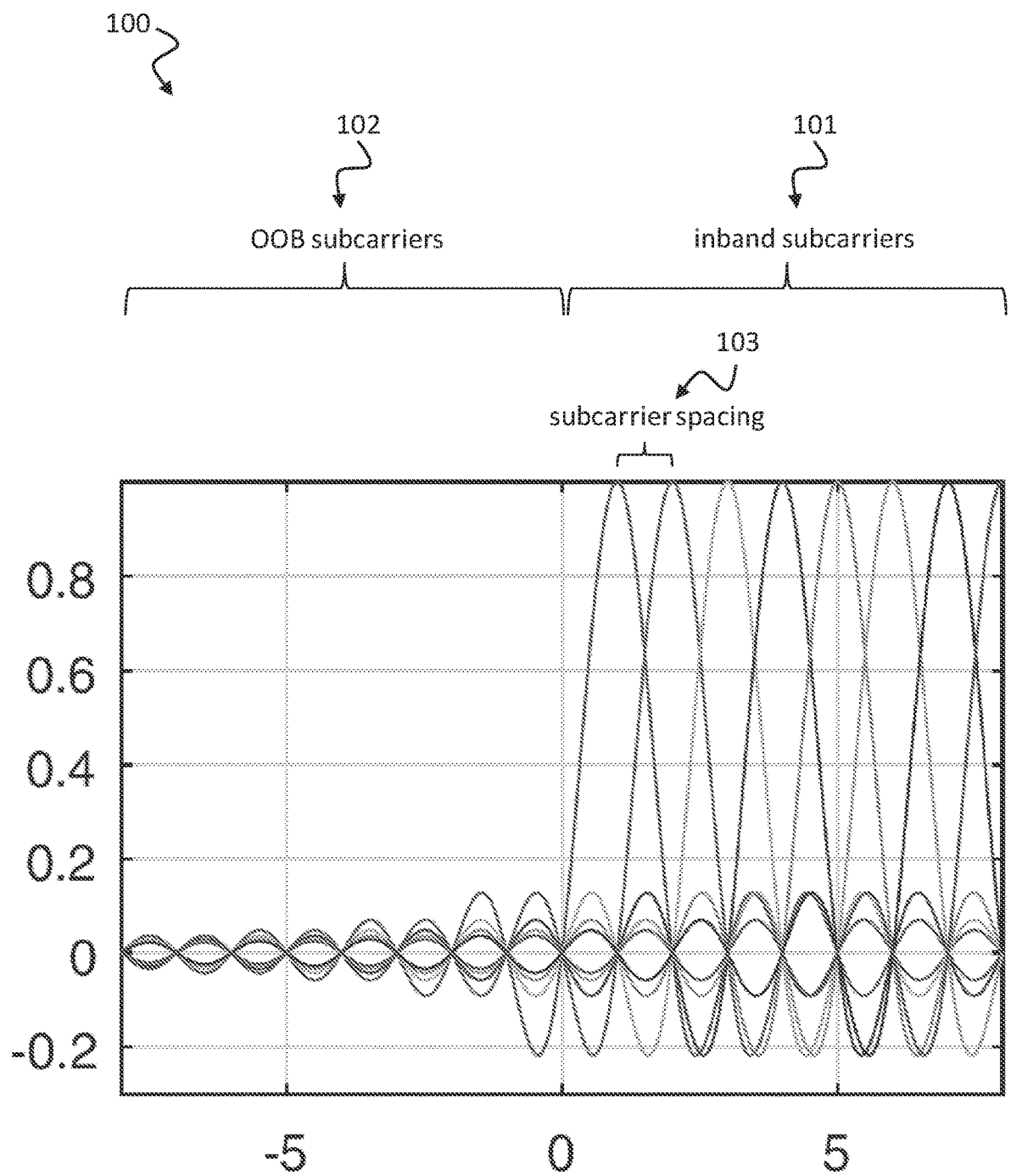
FIG. 1 shows a frequency diagram 100 illustrating transmit subcarriers of a multicarrier signal and the OOB sidelobes.

FIG. 1 shows a frequency diagram illustrating transmit subcarriers 101 of a multicarrier signal 100 and the OOB sidelobes 102 in a multicarrier system such as OFDM. The usable frequency band (inband) begins with frequency 0 and ranges to positive frequencies while the negative frequency range is not used. Hence, subcarriers in the positive frequency range are denoted as inband subcarriers 101 while subcarriers in the negative frequency range are denoted as out-of-band (OOB) subcarriers 102. Note that any other frequency scheme with another distribution of inband subcarriers and OOB subcarriers can be applied as well. A spacing between the subcarriers is denoted as subcarrier spacing 103 which is equally distributed in this frequency scheme. Note that a non-equally distributed subcarrier spacing can be applied as well.

In the following, the transfer matrix is described which maps the inband data subcarriers 101 to the OOB emissions 102. In a perfect OFDM system where the receiver is perfectly synchronized with the transmitter, the OOB subcarriers 102 coincide exactly at the nulls between the sidelobes of the OFDM frequency waveform. FIG. 1 shows an oversampled frequency domain spectrum of an OFDM transmit signal at subcarriers starting at the index 0 and upwards. The OOB subcarriers 102 at −1 and downwards are all located at zeros of the OFDM pulse.

In practice, the receiver is slightly out of sync with the transmitter clock (or oscillator). Hence, the received signal is sampled at frequency locations which are slightly shifted from the exact zeros of the transmit signals. This yields an interference between the transmit signal and the received signal. The asynchronism between transmitter and receiver is denoted as the Frequency Offset (FO) hereinafter. It can be modelled as a random variable, making a simple subtraction of the transmit signal from the received signal not possible.

The transfer matrix W is based on the frequency offset parameter FO explained before. The matrix W is composed of Nb rows representing the total number of OOB subcarriers 102 and NT columns representing the total number of inband subcarriers 101. What the matrix represents is a mapping between an inband subcarrier 101 (a column) to an OOB subcarrier 102 (a row). The elements of the i-th row and j-th column element can be represented as $$W^{i,j} = \frac{\sin(\alpha\pi) \cdot (-1)^{\beta i + j}}{\pi \cdot (\beta i + j)},$$

where α is the FO normalized to the subcarrier spacing, and β is the distance between the OOB subcarriers 102. For example, β=2 means that every second OOB subcarrier 102 is considered. W is defined for OFDM waveform which has a sinc spectrum, however it can be generalized to any waveform with characteristic OOB pattern (for e.g. p-OFDM, FBMC, etc.).

The task of the precoder that will be explained in the sections below is to process the input data symbols in a way which will minimize the resultant OOB emissions characterized by the matrix W. In terms of linear algebra, this means that the data should ideally lie in the null space of the matrix W.

Figure 2:
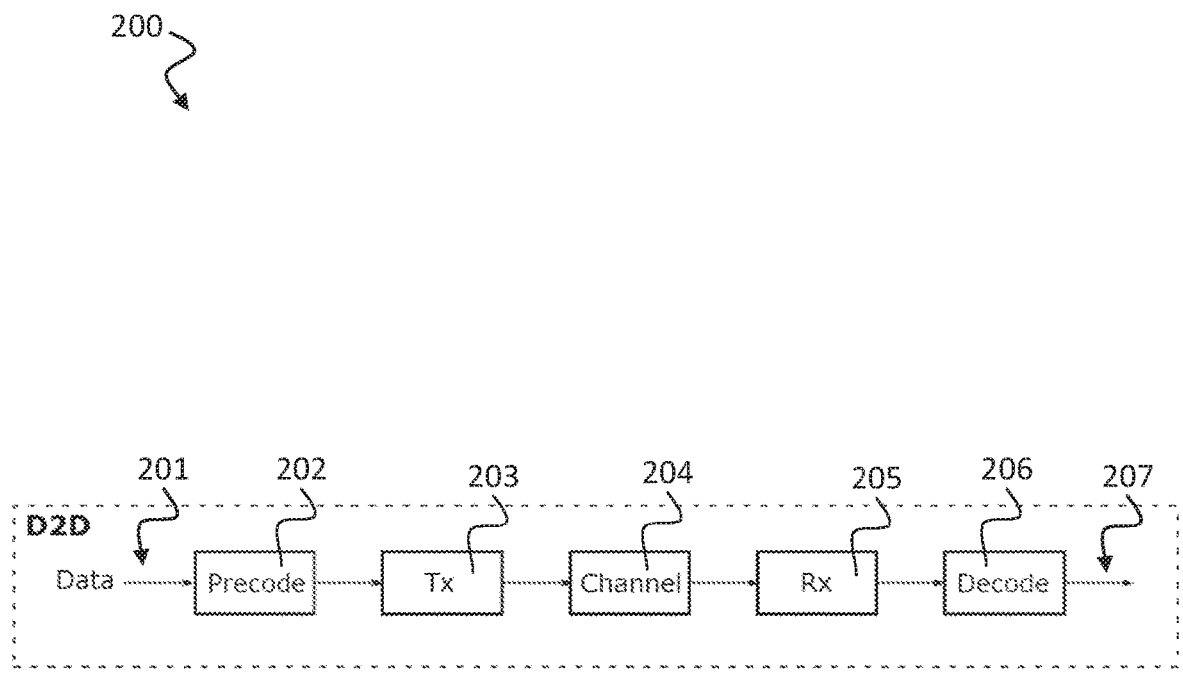
FIG. 2 shows a block diagram illustrating a device-to-device (D2D) precoding system 200 according to an implementation form.

FIG. 2 shows a block diagram illustrating a D2D precoding system 200 according to an implementation form. The D2D precoding system 200 includes a precoder 202 receiving data 201 to be precoded, a transmitter (TX) 203 transmitting the precoded data through a channel 204, a receiver (RX) 205 receiving the precoded data and a decoder 206 to decode the precoded data to reconstruct the original data 201 at an output 207.

As shown, the transmitter 203 totally modifies the signal using the precoder 202. This effect is then reversed at the receiver 205 using a decoder 206. The precoded data can be represented as $$\tilde{x} = \tilde{V}x,$$

where $\tilde{V}$ is the precoder 202 and x is the unprecoded data symbols 201. The precoder 202 should ideally lie in the null space of the matrix W. The precoder can be derived from the SVD decomposition of W. Theoretically, if there are NT inband subcarriers 101 and Nb OOB subcarriers shall be suppressed, then the maximum number of inband data subcarriers is NT-Nb, and there is Nb redundant subcarriers reserved in the inband. In simpler words, to suppress each subcarrier in OOB, at least one subcarrier inband needs to be reserved.

In the disclosed precoding scheme, the following preconditions hold:

The matrix W is constructed according to the Frequency Offset α, which changes according to the actual FO.

The ideal precoder condition of lying totally in the null space can be relaxed, the precoder may have some components on the OOB space.

The transmit signal does not have to be projected on the precoder space, instead, a special receiver is used which reverses the effect of the precoder.

Figure 3:
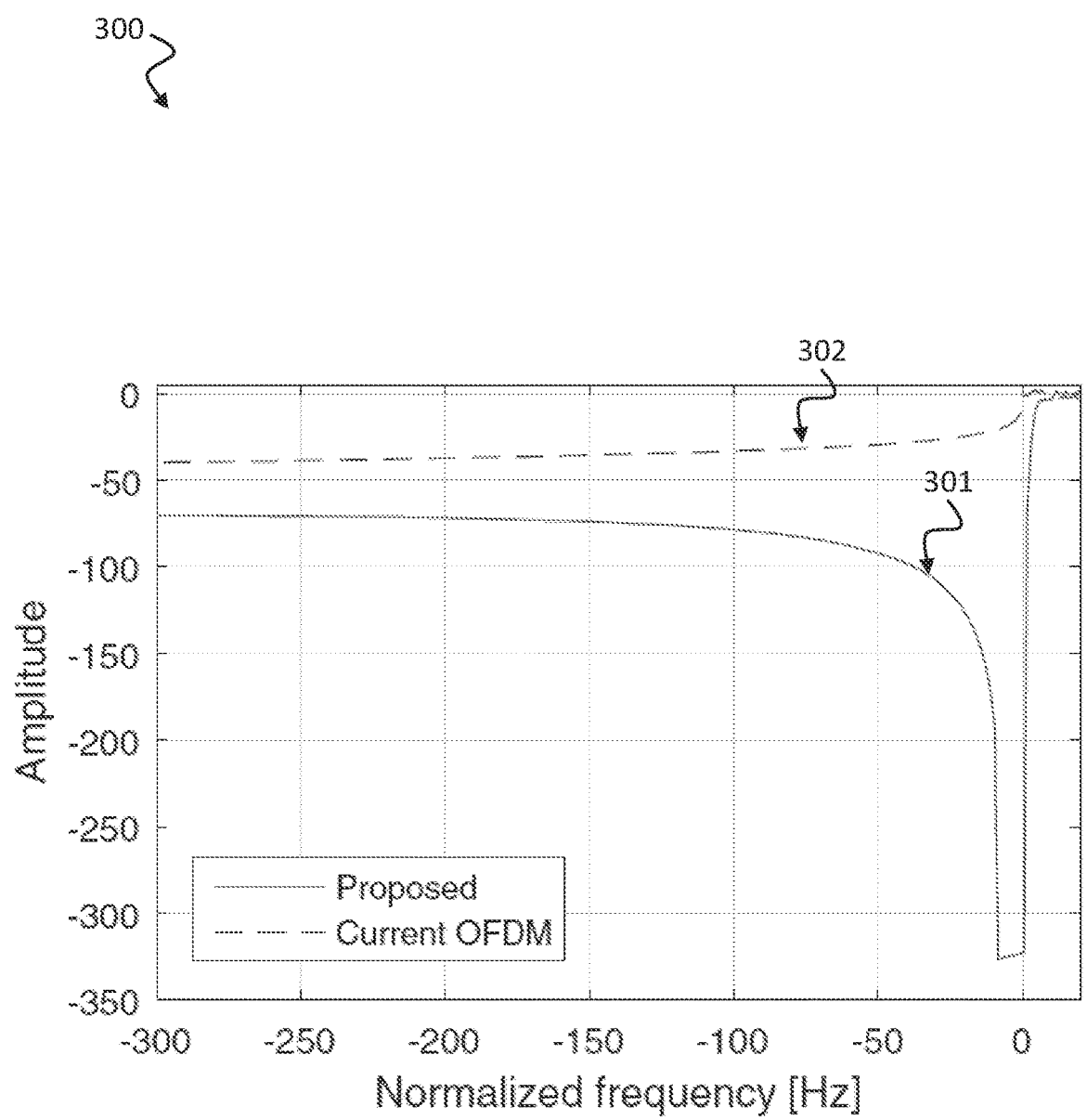
FIG. 3 shows a frequency diagram 300 illustrating exemplary OOB emission of a precoder which OOB emission fully lies in the null space of the transfer matrix.

FIG. 3 shows a frequency diagram 300 illustrating exemplary OOB emission of a precoder which OOB emission fully lies in the null space of the transfer matrix.

As shown in FIG. 3, there are very deep notches in the OOB subcarriers of the precoder 301 compared with that of the traditional OFDM 302. However, there are two main drawbacks of this precoder: The subcarriers which are not notched have a high level of emission which may cause self-interference. The notches are located adjacent to each other. It makes more sense to distribute the notches over a wider range. This is reflected in the parameter β which defines the distance between notches in OOB.

From the observations of FIG. 3, a new precoder design is derived that is presented in the following. The matrix W is subdivided into its Singular Value Decomposition (SVD) as follows:

$$U \cdot \begin{bmatrix} \lambda_1 & \cdots & & 0 \\ 0 & \lambda_2 & & \\ \vdots & & \ddots & 0_{N_b \times N_T - N_b} \\ 0 & & & \lambda_{N_b} \end{bmatrix} \cdot [\, v_1 \; \cdots \; v_{N_b - \kappa} \; \cdots \; v_{N_b} \; \cdots \; v_{N_T} \,]$$

The amplitude of the singular values λi describe how "strong" the corresponding column vector vi lies in the orthogonal space.

The singular vectors are sorted in descending order, hence λ1 has the strongest contribution to the OOB emission while λNb has the least contribution (close to orthogonality but not fully orthogonal).

The new precoder may be designed to include a certain amount of vectors denoted as κ which reflect the number of non-orthogonal vectors v selected from the non-orthogonal space. Naturally, these vectors should be selected from the least singular value to the largest to minimize the contribution to the OOB emission.

By including more independent vectors to the precoder, the number of redundant subcarriers can be reduced and they can be used for data transmission which boosts the spectral efficiency of the system compared to existing designs.

Alternatively, the number of OOB subcarriers Nb can be increased so that a wider range of suppression in OOB is covered.

Additionally, the parameter β can be tuned so that the notches of the OOB emissions are equally distributed across the range of subcarriers of OOB emission which are used for transmission in the opposite direction.

In the following an example a possible distribution of notches is described. In this example total available subcarriers are 100. For DL 60 subcarriers are used and 40 for UL. Then the DL precoder should distribute its notches over the 40 subcarriers of UL. If the number of notches is 10 (Nb=10), then to cover 40 subcarriers, β should be tuned to $$\frac{40}{10} = 4.$$

Figure 4:
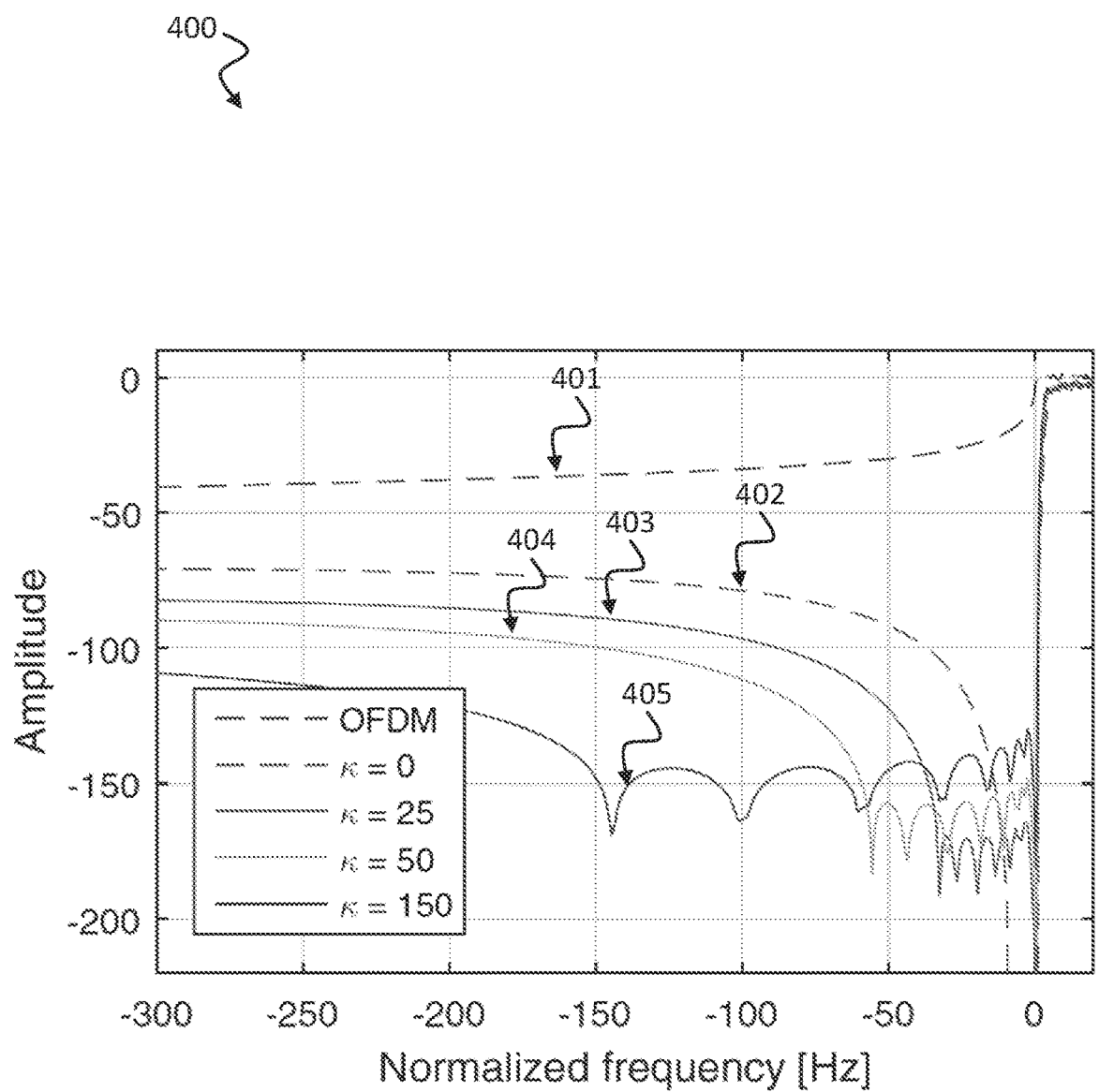
FIG. 4 shows a frequency diagram 400 illustrating exemplary OOB emission of a precoder according to the disclosure which OOB emission partially lies in the non-null space of the transfer matrix.

FIG. 4 shows a frequency diagram 400 illustrating exemplary OOB emission of a precoder according to the disclosure which OOB emission partially lies in the non-null space of the transfer matrix.

A result of the precoder (κ>0) 403, 404, 405 which OOB emission partially lies in the non-null space of the transfer matrix is shown compared to a precoder (κ=0) 402 which utilizes purely orthogonal space and non-precoded transmission 401. As can be seen from FIG. 4, the OOB for the non-null space precoding designs 403, 404, 405 is flatter compared to the null-space precoding 402 and the non-precoded transmission 401 and covers much more subcarriers. Additionally, the data rate of the non-null space precoding designs 403, 404, 405 is larger than for the other precoder designs.

In common transmitters, the redundant subcarriers which are inserted in the inband are practically unused and are considered as overhead. Those subcarriers, however, can be used for a useful purpose, which is to use them as reference signals (pilots). Pilots can be used for channel estimation at the receiver and help improve the decoder performance thus reduce retransmissions. In one implementation of the new precoder design, the reference signals can be multiplexed into the data signals in a way where the receiver can simply average the received signal over L subcarriers to obtain an estimate of the channel over L subcarriers. This is specifically useful in channel conditions where the frequency selectivity is limited.

Figure 5:
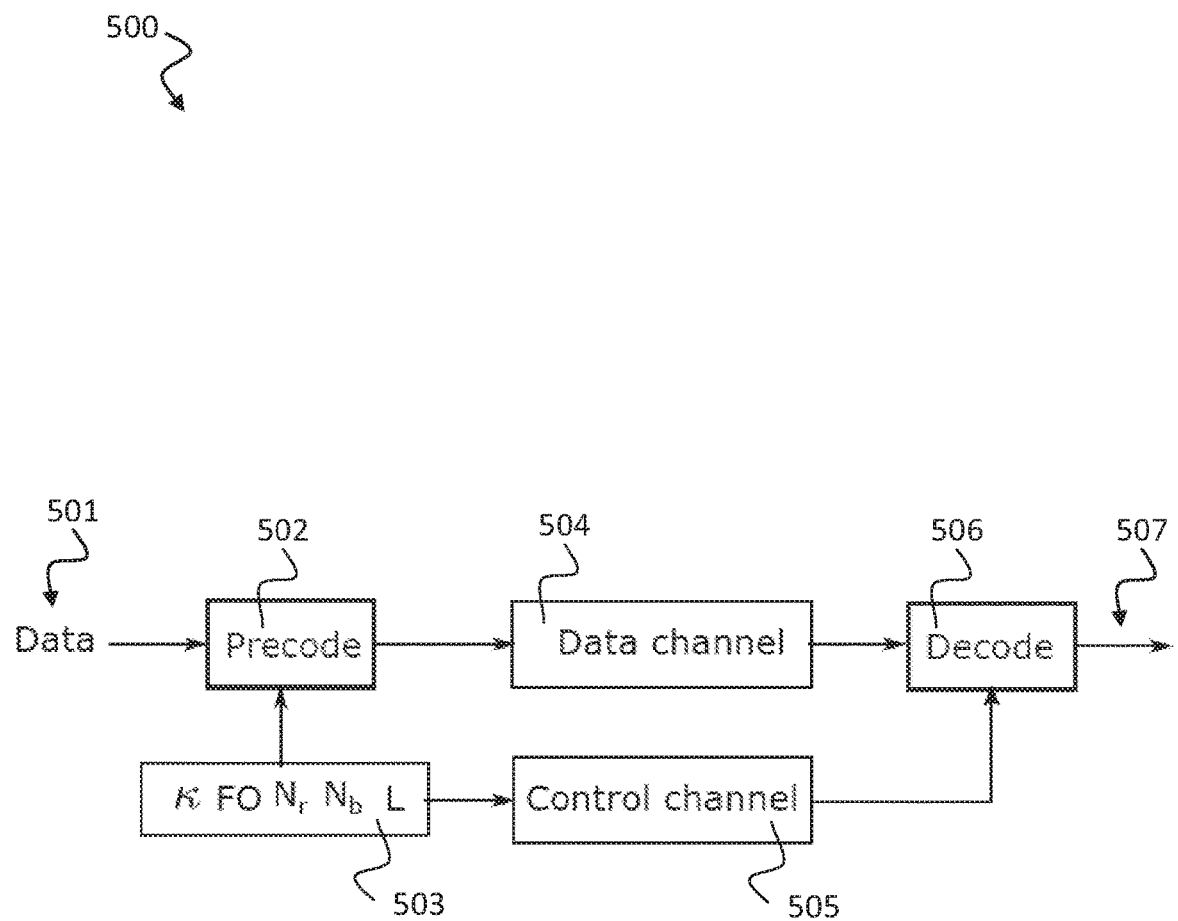
FIG. 5 shows an abstract block diagram of a D2D precoding system 500 according to an implementation form.

FIG. 5 shows an abstract block diagram of a D2D precoding system 500 according to an implementation form. This D2D precoding system 500 includes a precoder 502 precoding data 501 for transmission over a data channel 504. The received precoded data is decoded by a decoder 506 to provide a reconstruction of the data 501 at an output 507. The precoding system 500 includes a control path where specific parameters 503 of the precoder 502 for precoding the data 501 are signaled via a control channel 505 to the decoder 506. The decoder 506 can perform the decoding by exploiting these signaled parameters 503 used by the precoder 502. Note that in FIG. 5, no explicit transmitter and receiver is depicted to simplify the diagram.

The signalled parameters 503 sent from the transmitter to the receiver can be summarized as follows:
1. Frequency Offset α: This is a key parameter not presented in earlier approaches, it defines the precoder's transfer matrix W.
2. Number of OOB notch subcarriers Nb: This parameter changes according to the bandwidth that needs to be notched.
3. Number of data subcarriers Nr: This parameter also indicates the number of subcarriers used for channel estimation.
4. Number of non-orthogonal vectors κ: a novel parameter which defines the precoder's search space for projection. For κ=0 the precoder lies completely in null-space (similar to SotA), otherwise the precoder has some controlled projection on the null space.
5. Channel estimation subcarriers L: Defines the number of subcarriers across which the receiver can average the received signal to obtain an estimate of the channel.

The transmit precoder 502 may be derived from the transfer matrix W as described above with respect to FIG. 1. By observing the signaled parameters 503 defining the precoder 502 such as κ it can be easy checked if precoding according to the disclosure is applied. Additionally, the spectrum of the transmit signal is unique.

Figure 6:
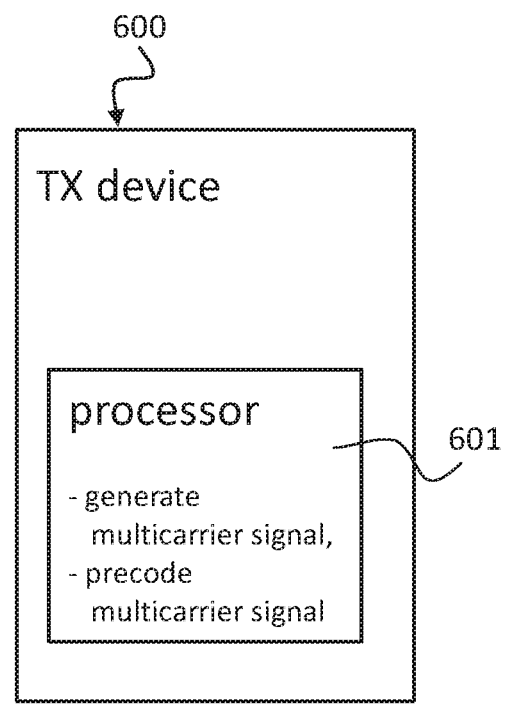
FIG. 6 shows a block diagram illustrating a transmission device 600 according to an implementation form.

FIG. 6 shows a block diagram illustrating a transmission device 600 according to an implementation form. The transmission device 600 includes a processor 601 configured to generate a multicarrier signal, e.g. a multicarrier signal 100 as shown in FIG. 1, based on a combination of data symbols and reference symbols. The multicarrier signal 100 includes a first plurality of inband subcarriers 101 and a second plurality of out-of band (OOB) subcarriers 102. The processor 601 is further configured to precode the multicarrier signal 100 based on a mapping function with respect to the first plurality of inband subcarriers 101 and the second plurality of out-of band subcarriers 102, wherein the mapping function is configured to mitigate the OOB subcarriers 102. The processor 601 may implement the tasks of the precoders described above with respect to FIGS. 2 to 5.

The mapping function may be based on a frequency offset (FO) between an oscillator of a transmitter transmitting the precoded multicarrier signal, e.g. a transmitter 203 described above with respect to FIG. 2, and an oscillator of a receiver receiving the precoded multicarrier signal, e.g. a receiver 205 described above with respect to FIG. 2. The frequency offset can be a frequency offset α normalized to the subcarrier spacing 103, e.g. as described above with respect to FIG. 5.

The mapping function may be based on a distance β between the out-of-band subcarriers 102, e.g. as described above with respect to FIG. 5. The mapping function may be based on a transfer matrix W transferring the first plurality of inband subcarriers 101 to the second plurality of out-of band subcarriers 102, e.g. as described above with respect to FIG. 1. The transfer matrix W may be based on an orthogonal frequency division multiplexing (OFDM) waveform, a polar-OFDM (p-OFDM) waveform or a filter bank based multicarrier (FBMC) waveform.

Elements of the transfer matrix W in the i-th row and the j-th column may be represented by the following OFDM waveform equation:

$$W^{i,j} = \frac{\sin(\alpha\pi) \cdot (-1)^{\beta i + j}}{\pi \cdot (\beta i + j)},$$

where α is the frequency offset normalized to the subcarrier spacing 103 and β is the distance between the out-of-band subcarriers 102, e.g. as described above with respect to FIG. 1.

The mapping function may be designed to project the first plurality of inband subcarriers 101 at least partially to the null space of the transfer matrix W, e.g. as described above with respect to FIG. 5. The mapping function may be designed to project at least one component on an OOB space of the transfer matrix W, e.g. as described above with respect to FIG. 5. The processor 601 may determine the mapping function based on a singular value decomposition (SVD) of the transfer matrix W, e.g. as described above with respect to FIG. 1. The mapping function may be based on a number κ of vectors selected from a non-orthogonal space of the SVD, e.g. as described above with respect to FIG. 5.

The processor 601 may sort the singular values $\lambda_i$ according to their amplitudes and may select the number κ of vectors from vectors corresponding to the smallest number κ of eigenvalues $\lambda_i$ from right matrix of the SVD, e.g. as described above with respect to FIGS. 1 and 5. The processor 601 may increase the number of OOB subcarriers 102 to cover a wider range of suppression in an OOB space of the transfer matrix W, e.g. as described above with respect to FIG. 5. The processor 601 may tune a distance (β) between the out-of-band subcarriers (102) in order to equally distribute notches in the OOB space of the transfer matrix W across the range of subcarriers, e.g. as described above with respect to FIG. 5.

The processor 601 may provide parameters 503 indicating properties of the mapping function for signaling over a control channel 505, e.g. as described above with respect to FIG. 5. These parameters may include the frequency offset α normalized to the subcarrier spacing 103, a number of OOB notch subcarriers $N_b$, a number of data subcarriers $N_r$, a number κ of non-orthogonal vectors and/or a plurality of reference signals subcarriers L, e.g. as described above with respect to FIG. 5.

Figure 7:
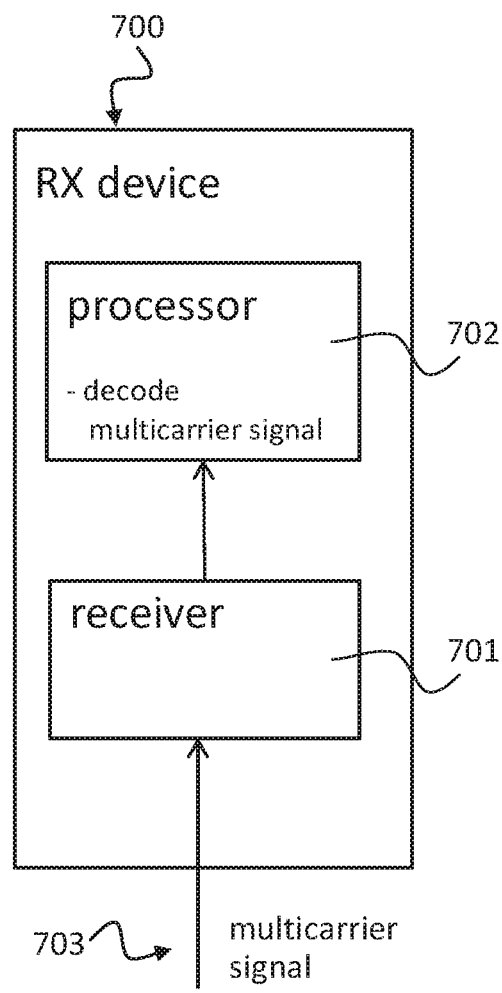
FIG. 7 shows a block diagram illustrating a reception device 700 according to an implementation form.

FIG. 7 shows a block diagram illustrating a reception device 700 according to an implementation form. The reception device 700 includes a receiver 701 configured to receive a multicarrier signal 703, e.g. a multicarrier signal 100 as described above with respect to FIG. 1, that is based on a combination of data symbols and reference symbols. The multicarrier signal 703, 100 includes a first plurality of inband subcarriers 101 and a second plurality of out-of band (OOB) subcarriers 102. The reception device 700 further includes a processor 702 configured to decode the multicarrier signal 703, 100 based on a mapping function with respect to a first plurality of inband subcarriers 101 and a second plurality of out-of band subcarriers 102, wherein the mapping function is configured to mitigate the OOB subcarriers 102. The processor 702 may implement the tasks of the precoders described above with respect to FIGS. 2 to 5. The processor 702 may implement the corresponding tasks for the decoding case as implemented by the processor 601 described above with respect to FIG. 6 for the precoding case.

The receiver 701 may receive parameters 503 indicating properties of the mapping function signaled over a control channel 505, e.g. as described above with respect to FIG. 5. These parameters may include the frequency offset α normalized to the subcarrier spacing 103, a number of OOB notch subcarriers $N_b$, a number of data subcarriers $N_r$, a number κ of non-orthogonal vectors and/or a plurality of reference signals subcarriers L, e.g. as described above with respect to FIGS. 5 and 6.

Figure 8:
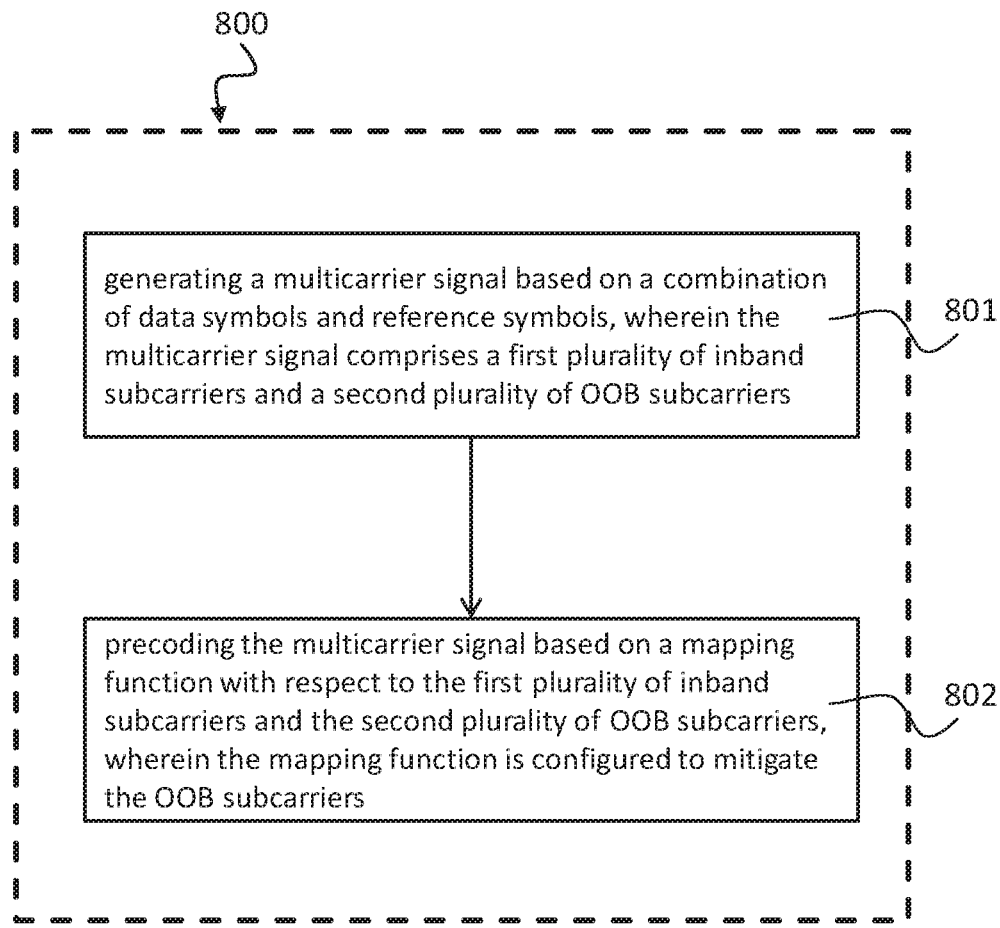
FIG. 8 shows a schematic diagram illustrating a transmission method 800 according to an implementation form.

FIG. 8 shows a schematic diagram illustrating a transmission method 800 according to an implementation form. The transmission method 800 includes: generating 801 a multicarrier signal, e.g. a multicarrier signal 100 as described above with respect to FIG. 1, based on a combination of data symbols and reference symbols, wherein the multicarrier signal 100 comprises a first plurality of inband subcarriers 101 and a second plurality of OOB subcarriers 102. The transmission method 800 further includes: precoding 802 the multicarrier signal 100 based on a mapping function with respect to the first plurality of inband subcarriers 101 and the second plurality of out-of band subcarriers 102, wherein the mapping function is configured to mitigate the OOB subcarriers 102.

The generating 801 a multicarrier signal 100 and the precoding 802 the multicarrier signal 100 may correspond to the tasks of the processor 601 described above with respect to FIG. 6.

Figure 9:
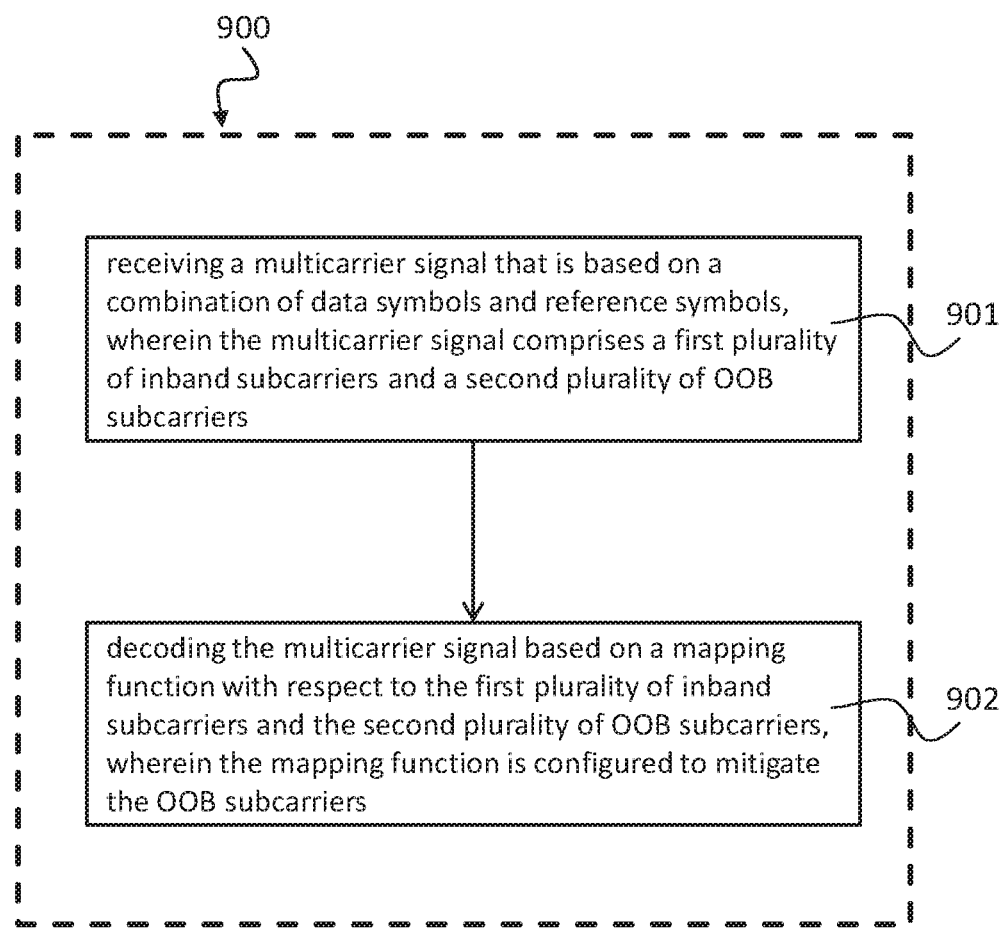
FIG. 9 shows a schematic diagram illustrating a reception method 900 according to an implementation form.

FIG. 9 shows a schematic diagram illustrating a reception method 900 according to an implementation form. The reception method 900 includes: receiving 901 a multicarrier signal, e.g. a multicarrier signal 100 as described above with respect to FIG. 1 that is based on a combination of data symbols and reference symbols, wherein the multicarrier signal 100 comprises a first plurality of inband subcarriers 101 and a second plurality of OOB subcarriers 102. The reception method 900 further includes: decoding 902 the multicarrier signal 100 based on a mapping function with respect to the first plurality of inband subcarriers 101 and the second plurality of out-of band subcarriers 102, wherein the mapping function is configured to mitigate the OOB subcarriers 102.

The decoding 902 the multicarrier signal 100 may correspond to the tasks of the processor 702 described above with respect to FIG. 7.

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the processing and computing steps described herein, in particular the methods 800, 900 described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A transmission device, comprising:
 a transmitter and a processor, the processor configured to:
 generate a multicarrier signal based on a combination of data symbols and reference symbols, wherein the multicarrier signal comprises a first plurality of inband subcarriers and a second plurality of out-of band (OOB) subcarriers; and precode the multicarrier signal based on a mapping function with respect to the first plurality of inband subcarriers and the second plurality of OOB subcarriers, wherein the mapping function is configured to mitigate the second plurality of OOB subcarriers, and wherein the mapping function is based on a frequency offset (FO) between an oscillator of the transmitter transmitting the precoded multicarrier signal and an oscillator of a receiver receiving the precoded multicarrier signal.

2. The transmission device of claim 1,
wherein the FO is normalized to a subcarrier spacing of the precoded multicarrier signal.

3. The transmission device of claim 1,
wherein the mapping function is based on a distance ($\beta$) between the out-of-band subcarriers.

4. The transmission device of claim 1,
wherein the mapping function is based on a transfer matrix W transferring the first plurality of inband subcarriers to the second plurality of OOB subcarriers.

5. The transmission device of claim 4,
wherein the transfer matrix W is based on one of an orthogonal frequency division multiplexing (OFDM) waveform, a polar-OFDM (p-OFDM) waveform or a filter bank based multicarrier (FBMC) waveform.

6. The transmission device of claim 4,
wherein elements of the transfer matrix W in an i-th row and a j-th column are represented by an orthogonal frequency division multiplexing (OFDM) waveform equation:

$$W^{i,j} = \frac{\sin(\alpha\pi) \cdot (-1)^{\beta i + j}}{\pi \cdot (\beta i + j)},$$

wherein $\alpha$ is the FO normalized to a subcarrier spacing and $\beta$ is a distance between out-of-band subcarriers of the second plurality of OOB subcarriers.

7. The transmission device of claim 4,
wherein the mapping function is configured to project the first plurality of inband subcarriers at least partially to a null space of the transfer matrix W.

8. The transmission device of claim 7,
wherein the mapping function is configured to project at least one component on an OOB space of the transfer matrix W.

9. The transmission device of claim 4,
wherein the processor is configured to determine the mapping function based on a singular value decomposition (SVD) of the transfer matrix W.

10. The transmission device of claim 9,
wherein the mapping function is based on a number ($\kappa$) of vectors selected from a non-orthogonal space of the SVD.

11. The transmission device of claim 10,
wherein the processor is configured to sort singular values ($\lambda_i$) according to their amplitudes and to select the number ($\kappa$) of vectors from vectors corresponding to the smallest number ($\kappa$) of eigenvalues ($\lambda_i$) from a right matrix of the SVD.

12. The transmission device of claim 4,
wherein the processor is further configured to increase a number of OOB subcarriers to cover a wider range of suppression in an OOB space of the transfer matrix W.

13. The transmission device of claim 4,
wherein the processor is further configured to tune a distance ($\beta$) between the OOB subcarriers in order to equally distribute notches in the OOB space of the transfer matrix w across the range of subcarriers.

14. The transmission device of claim 1,
wherein the processor is further configured to provide parameters indicating properties of the mapping function for signaling over a control channel.

15. The transmission device of claim 14,
wherein the parameters indicating properties of the mapping function comprise at least one of the following:
an FO parameter ($\alpha$) normalized to the subcarrier spacing,
a number of OOB notch subcarriers $N_b$,
a number of data subcarriers $N_r$,
a number ($\kappa$) of non-orthogonal vectors, or
a plurality of reference signals subcarriers L.

16. A reception device, comprising:
a receiver configured to receive a multicarrier signal that is based on a combination of data symbols and reference symbols, wherein the multicarrier signal comprises a first plurality of inband subcarriers and a second plurality of out-of band (OOB) subcarriers; and
a processor configured to decode the multicarrier signal based on a mapping function with respect to the first plurality of inband subcarriers and the second plurality of OOB subcarriers, wherein the mapping function is configured to mitigate the OOB subcarriers,
wherein the mapping function is based on a frequency offset (FO) between an oscillator of a transmitter transmitting the multicarrier signal and an oscillator of the receiver receiving the multicarrier signal, and
wherein the transmitter transmitting the multicarrier signal precodes the multicarrier signal based on the mapping function prior to transmitting the multicarrier signal to the receiver.

17. The reception device of claim 16,
wherein the receiver is further configured to receive parameters indicating properties of the mapping function signaled over a control channel.

18. The reception device of claim 17,
wherein the parameters indicating properties of the mapping function comprise at least one of the following:
an FO parameter ($\alpha$) normalized to the subcarrier spacing,
a number of OOB notch subcarriers $N_b$,
a number of data subcarriers $N_r$,
a number ($\kappa$) of non-orthogonal vectors, or
a plurality of channel estimation subcarriers L.

19. A transmission method performed by a transmission device, comprising:
generating, by a processor of the transmission device, a multicarrier signal based on a combination of data symbols and reference symbols, wherein the multicarrier signal comprises a first plurality of inband subcarriers and a second plurality of out-of band (OOB) subcarriers; and
precoding, by the processor, the multicarrier signal based on a mapping function with respect to the first plurality of inband subcarriers and the second plurality of OOB subcarriers, wherein the mapping function is configured to mitigate the second plurality of OOB subcarriers, and
wherein the mapping function is based on a frequency offset (FO) between an oscillator of a transmitter of the transmission device transmitting the precoded multicarrier signal and an oscillator of a receiver receiving the precoded multicarrier signal.

20. A reception method performed by a reception device, comprising:
- receiving, by a receiver of the reception device, a multicarrier signal that is based on a combination of data symbols and reference symbols, wherein the multicarrier signal comprises a first plurality of inband subcarriers and a second plurality of out-of band (OOB) subcarriers; and
- decoding, by a processor of the reception device, the multicarrier signal based on a mapping function with respect to the first plurality of inband subcarriers and the second plurality of OOB subcarriers, wherein the mapping function is configured to mitigate the second plurality of OOB subcarriers,
- wherein the mapping function is based on a frequency offset (FO) between an oscillator of a transmitter transmitting the multicarrier signal and an oscillator of the receiver receiving the multicarrier signal, and
- wherein the transmitter transmitting the multicarrier signal precodes the multicarrier signal based on the mapping function prior to the receiver receiving the multicarrier signal.

\* \* \* \* \*